2,762,664

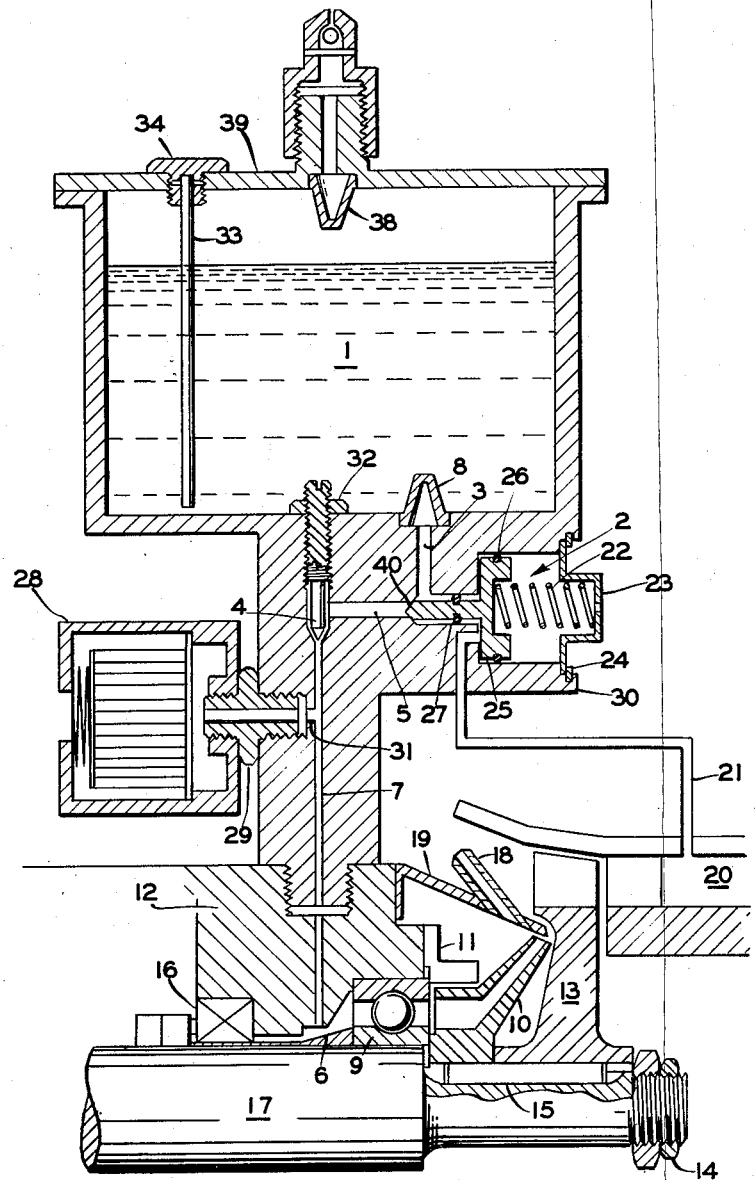

BEARING LUBRICATION SYSTEM

Edward V. Manning, Morris Plains, Edward C. Breinig, Maywood, and Joseph J. Witkiewicz, Paramus, N. J., assignors to Bendix Aviation Corporation, Teterboro, N. J., a corporation of Delaware Application January 21, 1955, Serial No. 483,326

5 Claims. (Cl. 308—76)

This invention presents a novel and efficient bearing lubrication system that find particular use in high speed, high temperature rotating machines in preventing bearing failure.

In machines of this nature special attention to bearing lubrication is required, lest the bearing burn out, and the associated moving parts be seriously damaged as a result thereof.

An object of this invention is, therefore, to prevent bearing failure in high speed, high temperature rotating machines.

A feature of the invention is novel means for controlling and passing a flow of lubricating oil and air through the bearings.

The invention further lies in the general structure and arrangement of the various elements of the device as well as in their cooperative association with one another.

The foregoing and other objects and advantages of this invention will appear more fully hereinafter from a consideration of the detailed description which follows, taken in conjunction with the accompanying drawings wherein an embodiment of the invention is illustrated by way of example. It is to be expressly understood, however, that the drawings are for purposes of illustration and description only, and are not intended as a definition of the limits of the invention.

The drawing is a schematic showing of a bearing lubrication system in a high speed, high temperature machine embodying the invention.

Referring now to the drawing, an oil reservoir 1 is connected to a shut-off valve 2 by a passage 3 through an oil filter 8. Passage 3 connects with a passage 5 leading to a metering pin 4. The metering pin communicates by a passage 7 to an annular space above a tapered spacer or collar 6. The outer race of a bearing 9 is held in a housing 12 by a retainer 11. A pump impeller 10 and turbine wheel 13 are attached to a drive shaft 17 by a key 15. The tapered spacer 6, the inner race of bearing 9, the pump impeller 10 and turbine wheel 13 are held together on shaft 17 by a retaining nut 14. An oil seal 16 is pressed into the housing 12. Ejector tubes 18 are brazed to a shroud 19 which is suitably mounted to the housing 12. A pressure air inlet 20 to the turbine leads by tubing 21 to a piston 25. On piston 25 are grooves which hold O rings 26 and 27 in their proper positions. A piston spring 22 is held in position by piston 25 and a cylinder cap 23. The cap is held to the housing by a snap ring 24. A piston needle 40 is normally urged by spring 22 to a position blocking passage 5 off from oil passage 3. An air filter 28 is connected to the housing by an adapter 29, and it communicates with oil passage 7 by a passage 31. A nut 32 locks the metering pin in a preadjusted position. An oil indicator rod 33 is pressed and pinned to a plug 34. An air filter 38 is provided in the cover 39 of the oil reservoir.

In the operation of the system when pressure air designed to rotate the turbine 13 at a high speed is admitted to the inlet passage 20, it also passes through the tubing 21 and is applied to the piston 25. The latter thereupon is moved against spring 22 and opens communication of passage 3 with passage 5. This allows oil from the reservoir 1 to pass by force of gravity through filter 8 and passage 3 to passage 5. From the latter is is metered by pin 4 into passage 7. Due to suction caused by rotation of pump impeller 10 and flow induced by the ejector tubes 18, air is brought through the air filter 28, cleaned and mixed with the oil in passage 7 coming from the metering pin 4. The oil-air mixture goes through passage 7 and falls upon the tapered spacer 6. The high speed rotation of the drive shaft 17 carrying the spacer breaks up the oil to fine particles. The resulting oil mist is caused to be carried and thrown up the ramp of the spacer 6 to the bearing 9 through which it is drawn by the pump impeller 10 and the ejector tubes 18, the bearing being cooled and lubricated as the oil mist passes through it.

It will be apparent from the above description that a differential pressure created across the bearing 9 causes the oil mist to flow through the bearing.

While an embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art, and it is my intent, therefore, to claim the invention not only as shown and described, but also in all such forms and modifications as may be reasonably construed to be within the spirit of the invention and the scope of the appended claims.

What is claimed is:

1. In a bearing lubrication system including a rotary shaft, a race bearing supporting the shaft and an impeller pump carried by the shaft to one side of the race bearing, adjustable means for metering a flow of oil from a reservoir, means for mixing air with the metered oil flow, an annular space about the shaft located at the opposite side of the race bearing and being sealed in an end furthest away from the bearing, conduit means for allowing the air-oil mixture to flow perpendicularly toward the rotating shaft through the space, the rotating shaft serving to break up the air-oil mixture into an oil mist, and the impeller pump serving to draw the air-oil mixture down the conduit means into the space and to suck the oil mist through the bearing to lubricate and cool the latter.

2. In a bearing lubrication system including a high speed rotating shaft, and a race bearing supporting the shaft, adjustable means for metering a flow of oil from a reservoir, means for mixing air with the metered oil flow, passage means for allowing the air-oil mixture to drop perpendicularly upon the rotating shaft through a space surrounding the shaft to one side of the bearing and sealed at the end thereof furthest from the bearing, the rotating shaft acting on the oil-air mixture to convert it into an oil mist, and suction means carried by the rotating shaft at the opposite side of the bearing serving to draw the air-oil mixture down the passage into the space and to suck the oil mist through the bearing.

3. In a bearing lubrication system including a high speed rotating shaft, a race bearing supporting the shaft, adjustable means for metering a flow of oil from a reservoir, means for mixing air with the metered oil flow, a tapered collar carried by the shaft with the wide diameter of the collar to one side of the bearing, passage means allowing the oil-air mixture to drop perpendicularly upon the tapered collar through a space surrounding the latter, the rotation of the collar with the shaft acting to break up the air-oil mixture to an oil mist, and the tapered collar serving to directionally guide the oil mist toward the bearing as the shaft rotates, impeller means carried by the shaft serving to draw the oil mist through the bearing, and an air driven turbine mounted to the shaft for driving the same at a high speed.

4. In a bearing lubrication system including a high speed rotating shaft, a race bearing supporting the shaft, means for metering a flow of oil from a reservoir, means for mixing air with the metered oil flow, a tapered collar carried by the shaft with the wide diameter of the collar to one side of the bearing, passage means allowing the oil-air mixture to drop through a space surrounding the tapered collar, the rotation of the collar with the shaft acting to break up the air-oil mixture to an oil mist, and the tapered collar serving to directionally guide the oil mist toward the bearing as the shaft rotates, and impeller means carried by the shaft serving to draw the oil mist through the bearing; wherein the rotating shaft is powered by an air driven turbine, an air-operated piston valve normally blocks the flow of metered oil, and passage means is provided for communicating driving pressure air both to the piston valve and to the turbine.

5. In a bearing lubricating system, including a rotatable shaft, a bearing having an inner race supporting the shaft and an outer race carried in the housing of the system, and further including an air driven turbine for driving the shaft at a high rate of speed; wherein the shaft carries an impeller suction pump at one side of the bearing, and the housing forms an annular space about the shaft at the opposite side of the bearing and has a common air-oil mixing passage leading vertically off from the annular space: air intake means communicating with the mixing passage, adjustable flow metering means communicating a flow line from an oil reservoir with the mixing passage, an air operated piston valve normally blocking oil flow through the flow line, and passage means for communicating driving pressure air both to the piston valve and to the turbine, whereby operation of the shaft causes the rotating impeller to draw air through the intake means into the common passage to mix with oil flowing through the metering means, and to draw the mixture through the annular space to the rotating shaft, the rotating shaft acting upon the air-oil mixture to convert it into an oil mist, and the impeller further serving to draw the oil mist through the bearing.

References Cited in the file of this patent
UNITED STATES PATENTS

| | | |
|---|---|---|
| 1,277,439 | Long | Sept. 3, 1919 |
| 1,769,736 | Fieux | July 1, 1930 |
| 1,893,995 | Jung | Jan. 10, 1933 |
| 2,001,823 | Knowlton | May 21, 1935 |
| 2,326,161 | Nelson | Aug. 10, 1943 |
| 2,334,942 | Malone | Nov. 23, 1943 |
| 2,349,131 | Anderson | May 16, 1944 |
| 2,551,660 | Feilden | May 8, 1951 |
| 2,681,837 | Boyd et al. | June 22, 1954 |